(12) United States Patent
Heller

(10) Patent No.: US 9,019,122 B2
(45) Date of Patent: Apr. 28, 2015

(54) INFORMATION RETRIEVAL FOR BOUNDARY READING PROCESSING

(71) Applicant: Itron, Inc., Liberty Lake, WA (US)

(72) Inventor: Lawrence D Heller, Raleigh, NC (US)

(73) Assignee: Itron, Inc., Liberty Lake, WA (US)

( * ) Notice: Subject to any disclaimer, the term of this patent is extended or adjusted under 35 U.S.C. 154(b) by 209 days.

(21) Appl. No.: 13/787,580

(22) Filed: Mar. 6, 2013

(65) Prior Publication Data

US 2014/0253342 A1  Sep. 11, 2014

(51) Int. Cl.

| G08B 23/00 | (2006.01) |
| --- | --- |
| G08C 15/06 | (2006.01) |
| H04B 1/56 | (2006.01) |
| H01H 37/76 | (2006.01) |
| G06F 17/30 | (2006.01) |

(52) U.S. Cl.
CPC ..................................... *G08C 15/06* (2013.01)

(58) Field of Classification Search
USPC ................. 340/870.02, 870.03, 539.26, 10.1; 707/802
See application file for complete search history.

(56) References Cited

U.S. PATENT DOCUMENTS

| 8,279,778 B2* | 10/2012 | Shuey ........................... 370/259 |
| --- | --- | --- |
| 2004/0001008 A1* | 1/2004 | Shuey et al. ............. 340/870.02 |
| 2005/0052288 A1* | 3/2005 | Osterloh et al. ......... 340/870.02 |
| 2006/0012491 A1* | 1/2006 | Mahowald ............... 340/870.02 |
| 2006/0091877 A1* | 5/2006 | Robinson et al. .......... 324/76.11 |
| 2011/0039512 A1* | 2/2011 | Ferchland et al. .......... 455/343.1 |
| 2011/0068947 A1* | 3/2011 | Holman et al. .......... 340/870.02 |
| 2012/0163424 A1* | 6/2012 | Ferchland et al. ............ 375/219 |
| 2012/0182157 A1* | 7/2012 | Carr ........................ 340/870.02 |
| 2014/0253344 A1* | 9/2014 | Heller ...................... 340/870.03 |

* cited by examiner

*Primary Examiner* — Fekadeselassie Girma
(74) *Attorney, Agent, or Firm* — Lee & Hayes, PLLC

(57) ABSTRACT

Information in a data store may be efficiently accessed to perform boundary reading processing. In one example, register readings of one or more register channels that are linked to one or more interval channels may be retrieved from the data store to determine whether or not a boundary reading of a time span is missing. If a boundary reading is missing, but a proximate register reading exists, the boundary reading may be estimated from the proximate register reading and at least one interval reading.

20 Claims, 7 Drawing Sheets

INFORMATION RETRIEVAL FOR BOUNDARY READING PROCESSING

BACKGROUND

A meter data management service may manage hundreds of thousands or millions of metering devices. As part of the management process, the meter data management service may perform utility processing for multiple service point channels, such as validation of readings of the channels, reporting of readings of the channels, etc. The utility processing may require readings that are stored in a data store. To obtain the readings, the meter data management service may query the data store for information associated with the readings and, thereafter, for the readings themselves based on the information. The information and readings are obtained as each piece of data is needed by the meter data management service, resulting in a large number of queries to the data store for relatively small amounts of data. This often lengthens the time needed to obtain the readings and perform the utility processing. Accordingly, there is an increasing need to access readings and information associated with the readings in an efficient manner, particularly in the utility environment where millions of readings exist.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
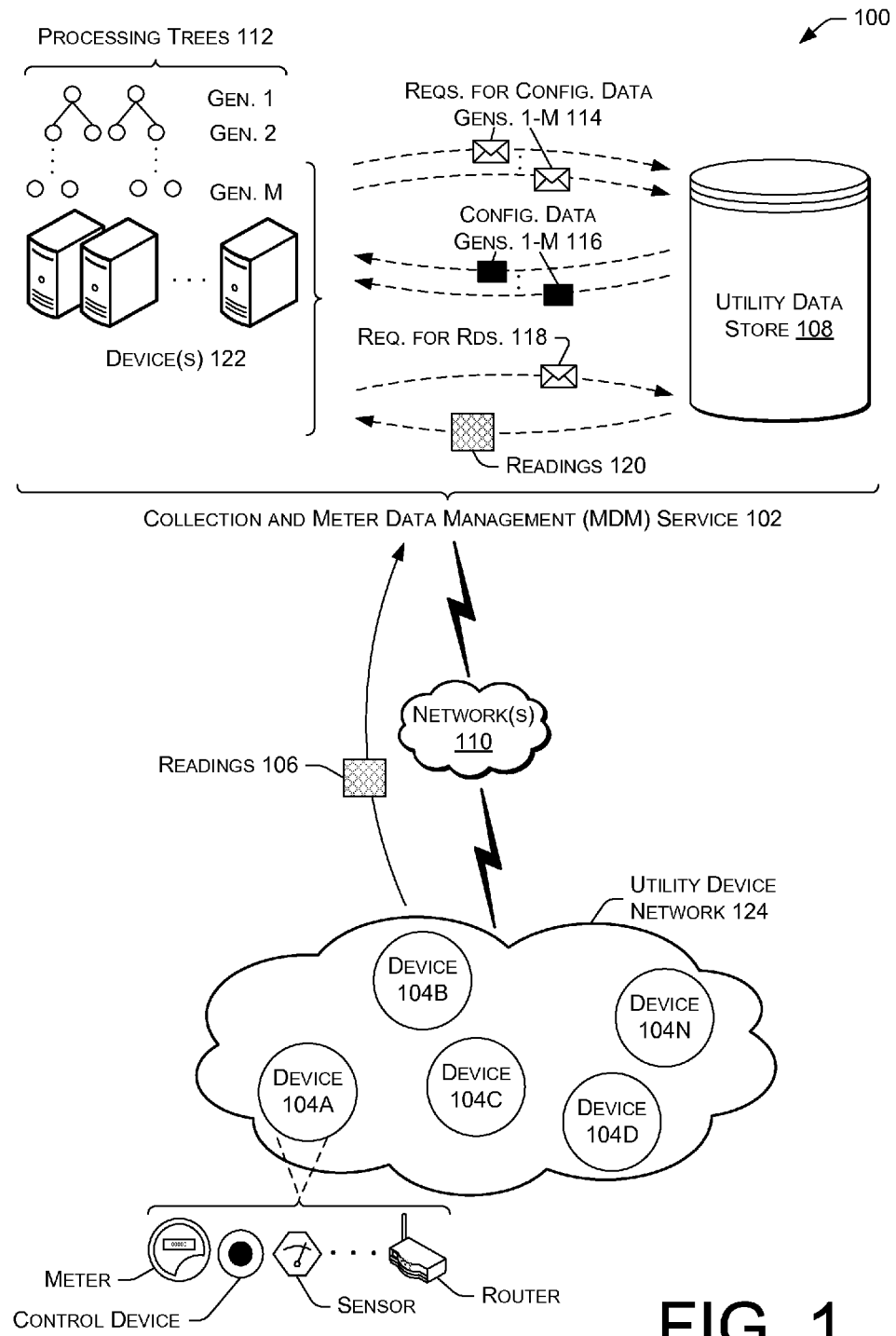
FIG. 1 illustrates an example architecture in which techniques described herein may be implemented.

As discussed above, current techniques for accessing information stored in a utility data store include obtaining information and readings as each piece of data is needed, resulting in a large number of queries to the data store for relatively small amounts of data.

This disclosure describes, in part, techniques for efficiently accessing information in a utility data store by querying the utility data store for batches of information. In particular implementations, a calculation engine of a meter data management service may receive a request for readings for one or more service point channels of a particular time span that are stored in a utility data store. The request may be received from an application of the meter data management service, a third party, a web service, or any other entity. Some of the service point channels of the request (e.g., "formula service point channels") may have an associated formula specifying how to calculate their readings from stored readings of other service point channels (e.g., "referenced service point channels" or "contributor service point channels"). This information about a formula of a service point channel may be specified by configuration data for the service point channel. Other service point channels of the request (e.g., "direct reference service point channels") directly reference stored readings. This type of channel can be processed as though it has a trivial formula consisting of its own name (e.g., only its name). This allows the calculation engine to process both types of service point channels in an identical fashion.

To retrieve the requested readings, the calculation engine may build processing trees (e.g., Abstract Syntax Trees (ASTs)) for each of the service point channels identified in the request. While building the trees, the calculation engine may retrieve configuration data for the service point channels in batches at each generation of the processing trees. That is, configuration data for all of the processing trees may be retrieved with a single query to the utility data store for each level of service point channel references in the processing trees. This is in contrast to previous techniques which obtained configuration data as needed for individual service point channel references.

Upon building the processing trees and retrieving configuration data for the processing trees, the calculation engine may query the utility data store for all readings that are associated with the processing trees in a single query. This is in contrast to previous techniques where each request to the calculation engine requested readings for only one service point channel. The processing trees may then be evaluated based on the retrieved readings to generate readings for the service point channels of the processing trees. The generated readings may be provided to the entity as a response to the request so that the entity may perform utility processing, such as reporting the readings, aggregating the readings, validating the readings, and so on.

In some instances, a request for readings for one or more service point channels of a particular time span may request boundary readings of the particular time span (e.g., readings at start and end times of the time span). The request may allow the calculation engine to estimate boundary reads (e.g., "calculated reads") from proximate reads if reads do not exist at the boundaries. To obtain a boundary reading, the calculation engine may identify interval service point channels of the request that are linked to register service point channels. The calculation engine may then retrieve register readings from those register service point channels with a single query to the utility data store. The register readings may be obtained for an extended time span (e.g., a time span that is longer than the particular time span specified in the request).

The register readings may then be analyzed to determine whether or not a reading exists at each boundary of the time span specified in the request. If boundary readings exist at both boundaries, the calculation engine may continue on to the tree processing techniques based on the original time span of the request (e.g., build processing trees based on the original time span, retrieve readings based on the original time span, and evaluate the trees). Alternatively, if a reading does not exist for a boundary (e.g., a boundary reading is missing), but a proximate register reading to the boundary does exist, the calculation engine may continue on to the tree processing techniques for the linked interval channel based on an extended time span. Thereafter, the calculation engine may estimate a missing boundary reading from one or more interval readings that were retrieved with the extended time span and from the proximate register reading that was initially retrieved before performing the tree processing techniques. The estimated boundary reading may be provided to the entity as a response to the request for boundary readings.

In some instances, the techniques described herein may allow information (e.g., configuration data and/or readings) to be retrieved with a relatively small number of queries to a data store, in comparison to previous techniques that retrieved information as needed in relatively small amounts. For example, by retrieving configuration data for multiple service point channels at a same time for each generation of all processing trees for multiple requested service point channels, configuration data may be obtained with relatively few queries to the data store. Further, by obtaining all readings for the service point channels with a single query to the data store, queries to the data store may be further reduced.

In addition, the techniques described herein may utilize a relatively small number of queries to a data store to perform boundary reading processing, in comparison to previous techniques. For example, by retrieving register readings for all register channels that are linked to interval channels of a request with a single query to the data store, and by retrieving interval readings needed for estimating boundary reads and which may be outside the requested time span with a single query, the techniques may utilize a single query to determine whether or not to calculate a boundary reading and another single query to retrieve the originally requested readings as well as the intervals needed to estimate boundary reads.

The techniques are described herein in the context of a utility environment that includes a variety of utility nodes, such as smart utility meters, sensors, control devices, transformers, switches, relays, or the like. However, these techniques may alternatively, or additionally, be applicable to other contexts, such as a stock market analysis, a weather analysis, a commerce computation for variable items (e.g., acquisition of gas which varies in price over time), or any other context that includes values that vary with time.

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Example Architecture

FIG. 1 illustrates an example architecture 100 in which techniques described herein may be implemented. The architecture 100 includes a collection and meter data management (MDM) service 102 that manages a plurality of utility devices 104A, 104B, 104C, 104D, ... 104N (collectively referred to as utility devices 104). The collection and MDM service 102 may collect readings 106 for storage in a utility data store 108, manage access to information stored in the utility data store 108 (e.g., the readings 106, configuration data, etc.), and perform various processing with information retrieved from the utility data store 108. Although the collection and MDM service 102 is illustrated as a single service in the architecture 100 for ease of illustration, the collection and MDM service 102 may be implemented as separate services and/or on separate devices.

In many instances, the collection and MDM service 102 accesses information from the utility data store 108 through a network, such as a local network between the service 102 and the utility data store 108, a wide area network 110, or any other network(s). To access information in the utility data store 108, a particular amount of overhead time may be required, due to time needed to communicate over the network, time needed to compile a query, and so on. Thus, many of the techniques discussed herein efficiently access information of the utility data store 108 by requesting (e.g., fetching) batches of information.

In one example implementation of the architecture 100, the collection and MDM service 102 may obtain readings for a particular set of service point channels by retrieving configuration data in batches while building processing trees 112 for the service point channels. As illustrated in FIG. 1, the collection and MDM service 102 sends requests 114 (e.g., queries) one-by-one for configuration data for generations 1-M of the processing trees 112. In response to each of the requests 114, the utility data store 108 may provide configuration data for the requested generation (illustrated as configuration data 116 for generations 1-M). Thereafter, the collection and MDM service 102 may retrieve readings for the service point channels by sending a request 118 to the utility data store 108 for all readings associated with the processing trees 112. In response, the utility data store 108 may send readings 120. In another example, the collection and MDM service 102 may calculate a boundary reading with a minimum number of queries to the utility data store 108, as discussed in further detail below.

The collection and MDM service 102 may be implemented by one or more computing devices 122, such as one or more servers, personal computers, laptop computer, and so on. The one or more computing devices 122 may be configured in a cluster, data center, cloud computing environment, or a combination thereof. The one or more devices 122 may provide cloud computing resources, including computational resources, storage resources, and the like, that operate remotely to a client device. For example, the one or more devices 122 may be implemented in a hosted environment over a network, such as the internet, to provide functionality to one or more remote devices.

Although the techniques described herein are generally described as being performed by the collection and MDM service 102, the techniques may alternatively, or additionally, be performed by a client device. For example, the techniques may be performed by a client device of a public utility (e.g., a water, gas, or electricity company), a customer, a user associated with the collection and MDM service 102, a service person, etc. A client device may comprise a laptop computer, desktop computer, a smart phone, an electronic reader device, a mobile handset, a personal digital assistant (PDA), a portable navigation device, a portable gaming device, a tablet computer, a watch, a portable media player, and the like.

As illustrated in FIG. 1, the utility devices 104 may form a utility node network 124, such as an autonomous routing area (ARA) network, which may be part of a larger utility communication network. The utility node network 124 may comprise, for example, a wide area network (WAN), metropolitan area network (MAN), local area network (LAN), neighborhood area network (NAN), personal area network (PAN), or the like. In some instances, the utility devices 104 are configured for automated meter reading (AMR).

The utility devices 104 may be communicatively coupled to each other via direct communication paths (e.g., wireless connections). Each direct communication path may represent a plurality of channels over which a node is able to transmit and/or receive data. Each of the plurality of channels may be defined by a frequency range which may be the same as or different from frequency ranges of others of the plurality of channels. In some instances, the plurality of channels comprises radio frequency (RF) channels.

Each of the utility devices 104 may be implemented as any of a variety of computing devices such as, for example, smart utility meters (e.g., electric, gas, and/or water meters), control devices, sensors (e.g., temperature sensors, weather stations, frequency sensors, etc.), transformers, routers, servers, relays (e.g., cellular relays), switches, valves, combinations of the foregoing, or any device couplable to a communication network and capable of sending and/or receiving data. In some cases, the utility devices 104 may include different types of devices (e.g., smart meters, cellular relays, sensors, etc.), different generations or models of devices, and/or devices that otherwise are capable of transmitting on different channels and using different modulation techniques, data rates, protocols, signal strengths, and/or power levels. In these cases, the utility device network 124 may represent a heterogeneous network of devices.

The utility devices 104 may generally provide the readings 106 to the collection and MDM service 102 for storage in the utility data store 108. In some instances, one or more of the readings 106 are obtained automatically on a periodic interval over the network 110. The network 110 may represent a backhaul network, such as the internet. In other instances, one or more of the readings 106 are obtained by a meter reading device (e.g., handheld device) that interrogates the utility devices 104 when in proximity to the utility devices 104 (e.g., a predetermined distance). Here, the readings 106 may be uploaded to the utility data store 108 from the meter reading device.

Example Collection and MDM Service

Figure 2:
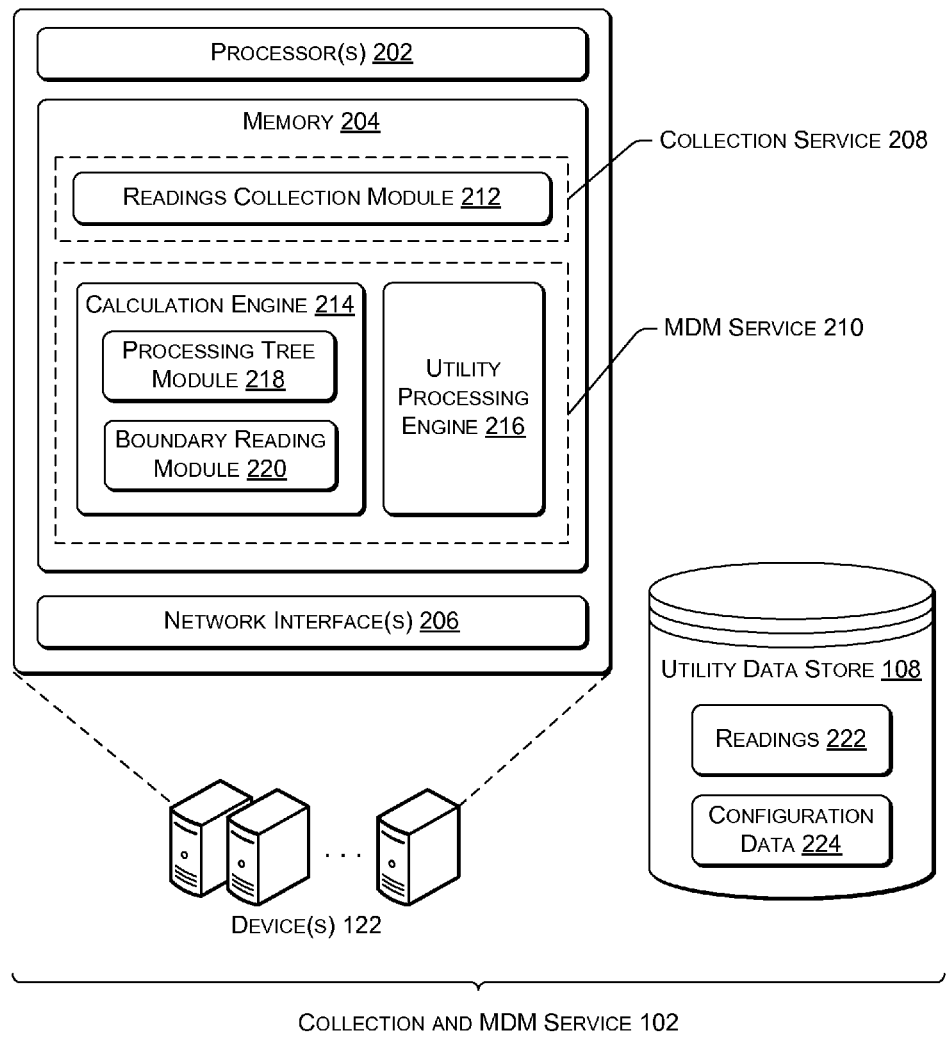
FIG. 2 illustrates a schematic diagram showing details of an example collection and meter data management service.

FIG. 2 is a schematic diagram showing details of the example collection and MDM service 102 of FIG. 1. The service 102 may include, or be associated with, the one or more devices 122 and the utility data store 108. The one or more devices 122 may be equipped with one or more processors 202, memory 204, and one or more network interfaces 206. The memory 204 may be communicatively coupled to the one or more processors 202 and may include software functionality configured as one or more modules.

As used herein, the term "module" is intended to represent example divisions of software for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions.

The one or modules of the devices 122 may be configured to implement a collection service 208 and/or a meter data management (MDM) service 210. As illustrated, the collection service 208 may include a readings collection module 212 configured to collect readings from the utility devices 104 and/or store the readings in the utility data store 108. The MDM service 210 may include a calculation engine 214 (e.g., module) configured to perform various calculations and/or retrieve information from the utility data store 108 and a utility processing engine 216 configured to perform utility processing based on information provided by the calculation engine 214.

For ease of illustration the elements of the collection service 208 and the MDM service 210 (e.g., engines, modules, etc.) are illustrated as being included in a same memory unit (e.g., the memory 204). However, these elements may be located in separate memory units and/or may be implemented on separate computing devices. In one example, the collection service 208 is implemented on a first set of computing devices and the MDM service 210 is implemented on a second set of computing devices. Further, in some instances the collection service 208 and/or the MDM service 210 may be associated with a central office of a utility to perform centralized meter information collection and/or meter data management techniques.

The calculation engine 214 may include a processing tree module 218 to generate and/or evaluate service point channel processing trees for service point channels. In one example, a service point processing tree comprises an Abstract Syntax Tree (AST), which may be generated in part or in whole by a parser. Here, the processing tree module 218 may receive input, such as a string comprising a formula, and parse the input to form a tree of nodes. The calculation engine 214 may also include a boundary reading module 220 to perform boundary reading processing, such as a determining whether a boundary reading exists and/or calculating a missing boundary reading.

Meanwhile, the utility processing engine 216 may perform utility processing based on information received from the calculation engine 214. The utility processing may include, for example, reporting, exporting, aggregating, validating, calculating, estimating, updating (e.g., editing), or graphing readings. Additionally, or alternatively, the utility processing may include generating billing information or other types of information based on readings. In one example, the utility processing engine 216 may validate an accuracy of interval readings from interval channels based on register readings from register channels that are linked to the interval channels.

The utility data store 108 may store readings 222, configuration data 224, and/or other information. As used herein, a reading may refer to a single reading or a time series of readings (e.g., multiple readings over a time span). A reading may generally refer to a measure of consumption of a resource (e.g., gas, electricity, water, etc.), a measure of demand for a resource, a measure of a value related to delivery of a resource (e.g., volt-amps, voltage, etc.), or any other value or series of values that varies in time (e.g., temperature at a metering location, barometric pressure, etc.). Although the utility data store 108 is illustrate in FIG. 2 as being implemented as a single unit, in some instances the data store 108 is implemented as multiple units. Further, although the utility data store 108 is illustrated as being part of the collection and MDM service 102, the utility data store 108 may be located remotely to the collection and MDM service 102. Further, in some instances the utility data store 108 may be part of the one or more devices 122.

As used herein, a service point may generally comprise a logical point of delivery of a resource, such as gas, electricity, water, and so on. In some instances, the service point may refer to a physical location to which energy is delivered, such as a location where a conductor of a resource service provider interfaces with a conductor of a customer, while in other instances the service point may refer to a more abstract point of delivery, such as an account or a customer. In one example, a service point comprises a location for metering a resource.

A service point channel may define a data channel for a service point. In general, a service point channel may provide one or more reading values, or streams of reading values, for a given quantity, such as energy delivered to a service point (e.g., kilowatt hours, etc.), demand for energy at a service point (e.g., a rate of consumption, such as kilowatts, etc.), a temperature at a service point, and so on.

A service point channel may be classified in different ways. For example, a service point channel may be classified by its reading type to be categorized into one or more of the following categories:

Interval channels—For these channels, readings are taken at regular periodic intervals, for example, every 15 minutes or every hour (often referred to as the channel's interval length). A reading of an interval channel typically represents either an instantaneous measurement (e.g., a current temperature) or an accumulation or average of some quantity over the entire interval (e.g., an amount of energy used since a last interval ended, an average rate of consumption during an interval, etc.). An interval reading may be identified by an associated service point channel and/or start and end times (e.g., for a 15 minute interval channel, an interval starting at 1:00 PM and ending at 1:15 PM may be referred to as the interval reading ending at 1:15 PM). As interval readings may be taken continuously (e.g., every 15 minutes), a response to a request for readings of an interval channel for a specified time span (e.g., 24 hours) may include all readings of the specified time span. As used herein, an interval reading refers to a reading of an interval channel.

Register channels—For these channels, a reading may be obtained on demand (e.g., at random times). For example, a reading of a register channel may comprise a reading from a serviceman who travels to a physical site (e.g., house) to record information on a meter. In another example, a reading of a register channel may comprise a reading that is obtained on demand by a radio link or network connection (e.g., "always live" connection). In some instances, a register channel may measure a same type of value as an interval channel. As used herein, a register reading refers to a reading of a register channel.

Additionally, or alternatively, service point channels may be classified by a source of a reading into one or more of the following categories:

Metered channels—These channels may be associated with a physical meter or recording device. Each meter or recording device may be associated with one or more metered channels.

Imported channels—These channels are associated with reading that may be imported into the utility data store 108. The readings from these channels may not necessarily be obtained from a meter or recording device.

Formula channels—These channels are associated with readings that are determined by evaluating a formula. In one example, a formula is specified by a string comprising a sentence in a specific computer language specified by an MDM service. To illustrate, a formula string of "sp_10:6+sp_23:2" references a formula to sum channel 6 of service point "sp_10" and channel 2 of service point "sp_23." A formula may include any type of operation, such as addition, subtraction, multiplication, mathematical functions, unit conversion functions, date and time functions, and so on. When, for example, a formula channel is an interval channel, readings may be determined for each interval. Formula channels may sometimes be referred to as "virtual metered channels." To illustrate, a formula channel may provide a reading of gas flow in cubic feet corrected for standard temperature based on a metered channel measuring ambient temperature and a metered channel measuring gas consumption in cubic feet. In another illustration, a formula channel may provide a total amount of electricity consumption at a service point associated with two buildings. Here, the formula channel may sum readings of metered channels for the two buildings. In many instances, a formula channel references one or more other service point channels (also referred to as a "contributor channels"). When, for example, a particular formula channel references another formula channel, the particular formula channel may be referred to as a formula channel having a nested formula channel. In some instances, a formula channel may be categorized into a stored formula channel or a non-stored formula channel. A stored formula channel may evaluate a formula and store the result (e.g., reading) in the utility data store 108 to be accessed at a later time similar to a metered or imported channel. A non-stored formula channel may evaluate a formula and provide the result on demand (e.g., in real-time) without storing the result.

The configuration data 216 may comprise metadata that describes a service point or service point channel. The configuration data 216 may be considered information describing a "physical configuration" of the service point or service point channel. The configuration data 216 may indicate, for example:

A customer that is associated with a service point and/or an associated service point channel.

A service point channel(s) that is associated with a service point.

A type of a service point channel that is associated with a service point, such as a metered channel, imported channel, or formula channel. In some instances, configuration data may also indicate whether a service point channel is an interval or register channel.

A unit of measure of a service point channel (e.g., unit of a reading(s) of that channel). For example, a service point channel may be associated with kilowatt-hours.

A meter that is associated with a service point or an associated service point channel.

Information about an interval or register channel of a meter that is associated with a service point. For example, if a service point is associated with an interval channel, the information may indicate an interval length of the interval channel. If the service point is associated with a register channel, the information may indicate a number of dials on a meter, a multiplier used to convert a dial reading to a particular measurement unit, etc.

Information about a formula channel that is associated with a service point. For example, the information may include a formula of a formula channel (e.g., the formula text) and/or may indicate an entity that stores the formula.

Information about an imported channel that is associated with a service point channel. For example, the information may indicate a data entity that describes an interval length for the imported channel.

The memory 204 (as well as all other memory described herein) may include one or a combination of computer readable storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer storage media does not include communication media, such as modulated data signals and carrier waves. As such, computer storage media includes non-transitory media.

Example Reading Retrieval Techniques

Figure 3:
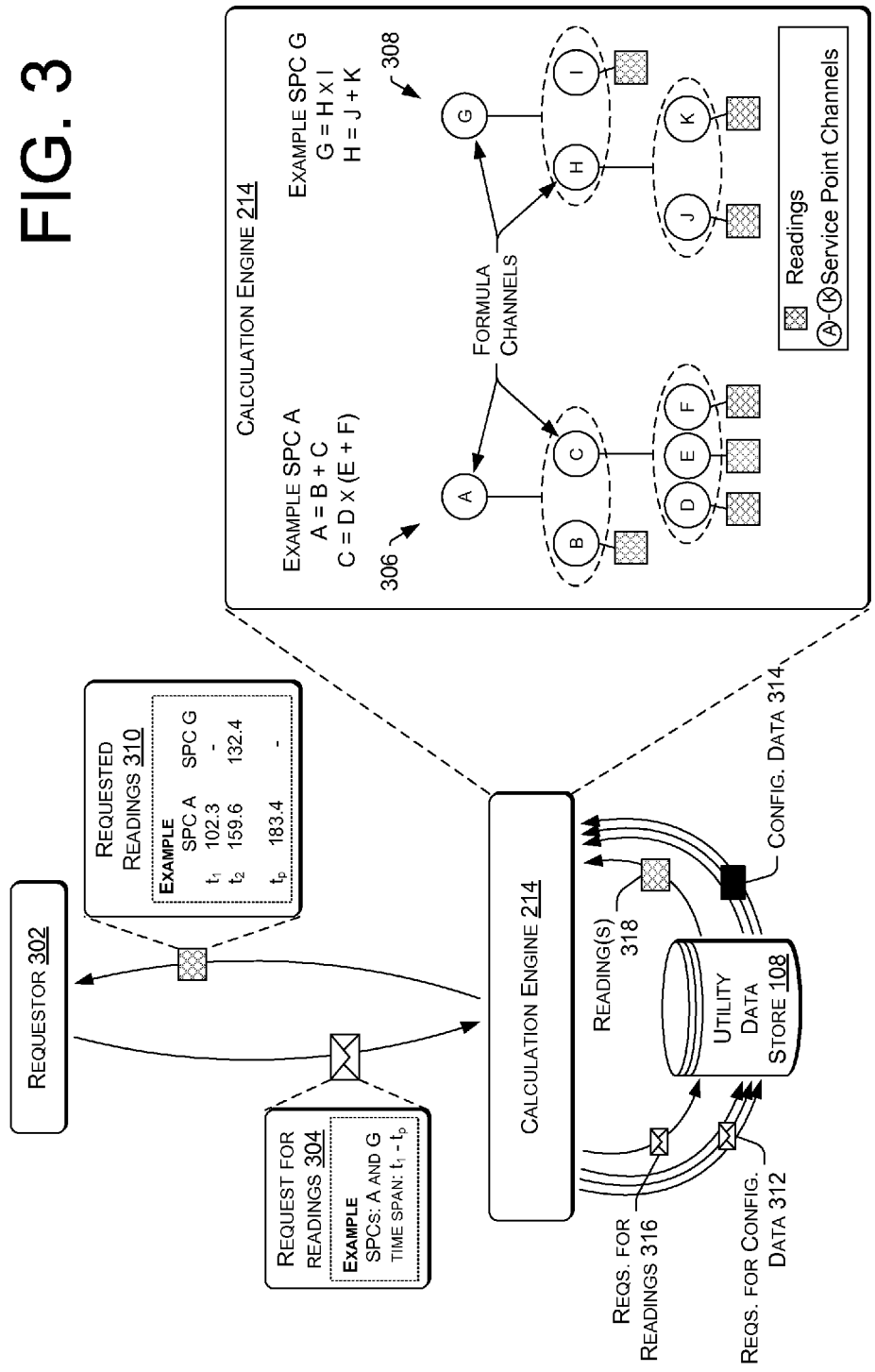
FIG. 3 illustrates example techniques to retrieve readings for service point channels from a utility data store.

FIG. 3 illustrates example techniques to retrieve readings for service point channels from the utility data store 108. For ease of illustration, the example reading retrieval techniques of FIG. 3 are discussed as being performed for two service point channels (e.g., service point channels A and G). However, these techniques may be utilized for any number of service point channels. In one example, readings are retrieved for a batch of thousands of service point channels.

In the example techniques of FIG. 3, a requestor 302 sends a request 304 to the calculation engine 214 for readings for service point channels A and G over a particular time span ($t_1$-$t_p$). The request 304 may request, for example, all readings from the service point channels A and G that were generated on a particular day (e.g., between 12 AM and 11:59 PM). The requestor 302 may comprise an application of the MDM service 210 (e.g., the utility processing engine 216 or another application), a third party, a web service, or any other entity.

To retrieve the requested readings, the calculation engine 214 may generate a processing tree 306 for the service point channel A and a processing tree 308 for the service point channel G. The processing trees 306 and 308 may be generated by adding nodes to the processing trees 306 and 308 generation-by-generation (e.g., level-by-level). A generation may generally represent a horizontal level of service point channels within a processing tree. For example, the nodes for service point channels B and C are at a same generation within the processing tree 306. The service point processing trees 306 and 308 may include nodes for service point channels and/or readings. In many instances, the processing trees 306 and 308 are generated in parallel generation-by-generation. Although the processing trees 306 and 308 are illustrated in FIG. 3 as including a same number of generations (e.g., three), the processing trees 306 and 308 may include any number of generations.

The calculation engine 214 may begin generating the processing trees 306 and 308 by retrieving configuration data for the root service point channels A and G. Both pieces of configuration data may be retrieved from the utility data store 108 with a single query (e.g., in a batched manner). The configuration data for the service point channels A and G may provide information for retrieving readings for the service point channels A and G. For example, the configuration data for the service point channel A may indicate that the service point channel A is a formula service point channel that is associated with contributor service point channels B and C. As noted above, a formula service point channel may require the evaluation of a formula in order to provide one or more readings for that service point channel. A formula may be based on contributor service point channels (e.g., channels that contribute to a formula result). In the example processing tree 306, one or more readings for the service point channel A may be determined by evaluating a formula that is based on readings from contributor service point channels B and C (e.g., A=B+C).

Based on the configuration data for the service point channels A and G, the calculation engine 214 may add nodes to the processing trees 306 and 308 at a next generation (e.g., level) of the trees 306 and 308. For example, nodes for service point channels B and C may be added to the processing tree 306 at a next level below the node for the service point channel A. The calculation engine 214 may then obtain configuration data for the next generation of the processing trees 306 and 308 (e.g., configuration data for service point channels B, C, H, and I). The configuration data for the service point channels at the next generation may be retrieved with a single query (e.g., fetch) to the utility data store 108. Based on the configuration data for the next generation of service point channels, the calculation engine 214 may then add nodes for a further generation of service point channels (e.g., nodes for service point channels D, E, F, J, and K). This process of building the processing trees 306 and 308 generation-by-generation may continue for any number of generations (e.g., levels) until all leaf nodes are identified (e.g., nodes for stored readings (fetch stored readings nodes)). As illustrated, the example processing trees 306 and 308 each include three generations of service point channels.

In the example of FIG. 3, the processing trees 306 and 308 each include two formula service point channels. The processing tree 306 includes the formula service point channels A and C, while the processing tree 308 includes the formula service point channels G and H. Further, as illustrated, the processing trees 306 and 308 each include a nested formula (e.g., a formula that requires the evaluation of another formula). To illustrate, the processing tree 306 includes the formula service point channel A that requires the evaluation of the formula service point channel C at a lower generation in the processing tree 306.

After the processing trees 306 and 308 are generated, the calculation engine 214 may retrieve readings for the "stored reading" service point channels of the processing trees 306 and 308 with a single query to the utility data store 108 (e.g., readings for service point channels B, D, E, F, I, J, and K). That is, all readings for the processing trees 306 and 308 (illustrated with seven readings nodes) may be obtained through a single request to the utility data store 108. The readings for the processing trees 306 and 308 may be utilized to evaluate the processing trees 306 and 308. The evaluation may include evaluating the formulas in each of the processing trees 306 and 308 to formulate requested readings 310. The evaluation may be based on one or more operations of the formulas (e.g., addition, subtraction, multiplication, mathematical functions, unit conversion functions, date and time functions, etc.). Although not shown in FIG. 3 for ease of illustration, in some instances the processing trees 306 and 308 include nodes for the operations of the formulas. The requested readings 310 may be returned to the requestor 302 as a response to the request for readings 304. In this example, the service point channel A is an interval channel that includes readings at times $t_1$, $t_2$, and $t_p$, while the service point channel G is a register channel that includes a reading at time $t_2$.

In sum, the calculation engine 214 may fetch configuration data for service point channels on a generation-by-generation basis across both of the processing trees 306 and 308. That is, configuration data for all service point channels of the processing trees 306 and 308 for a particular generation may be retrieved with a single fetch to the utility data store 108. The retrieval of configuration data is illustrated in FIG. 3 by the three arrows for requests for configuration data 312 pointing from the calculation engine 214 to the utility data store 108 and three arrows for configuration data 314 pointing from the utility data store 108 to the calculation engine 214. Further, the readings for the processing trees 306 and 308 may be retrieved with a single fetch to the utility data store 108 after the processing trees 306 and 308 are generated. In total, the calculation engine 214 may fetch information from the utility data store 108 in four instances—three fetches for configuration data and one fetch for readings.

As noted above, the reading retrieval techniques described herein utilize relatively few queries to a data store, in comparison to previous techniques. In one implementation of the current techniques, readings were obtained for one million service points in 100 sets or batches of 10,000 service points. By implementing the techniques described herein, the processing required 200 fetches to the data store, whereas the previous techniques required 5 million fetches to the data store. In considering the amount of overhead time associated with each fetch, the techniques described herein performed processing for the one million service points on the order of 100 to 1,000 times faster than the previous techniques.

Although the example reading retrieval techniques are described as being performed within the context of service point channels, in other instances the techniques are performed in other contexts. For example, the techniques may be applied to a stock market analysis, a weather analysis, a commerce analysis/calculation for variable items (e.g., determining a price of an item that is based on values that vary in time), and so on. In general, the techniques may be applicable to any context that requires values that vary in time. In these instances, the calculation engine 214 or another entity may receive a request for values for time-varying functions (e.g., service point channels). To provide the values, the calculation engine 214 or the other entity may retrieve metadata (e.g., configuration data) for the time-varying functions at a same time. The metadata may be utilized to obtain values (e.g., readings) for the time-varying functions. The values may be provided as a response to the request.

Example Processes

FIGS. 4-5 illustrate example processes 400 and 500 for employing the techniques described herein. For ease of illustration processes 400 and 500 are described as being performed in the architecture 100 of FIG. 1. For example, one or more of the individual operations of the processes 400 and 500 may be performed by the collection and MDM service 102. However, processes 400 and 500 may be performed in other architectures. Moreover, the architecture 100 may be used to perform other processes.

The processes 400 and 500 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the individual operations may be omitted.

Figure 4A:
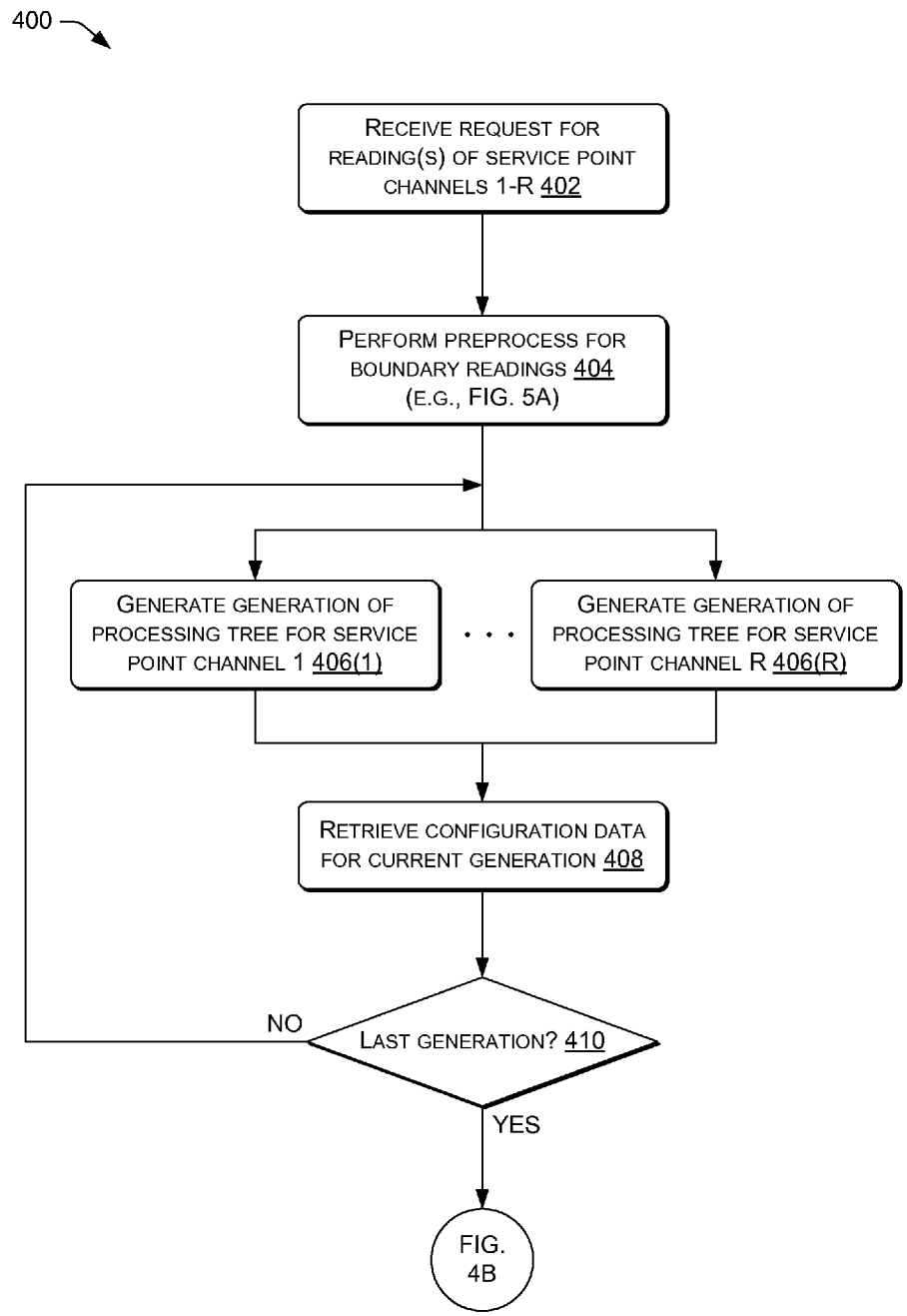
FIGS. 4A-4B illustrate an example process for retrieving readings for service point channels from a utility data store.
Figure 4B:
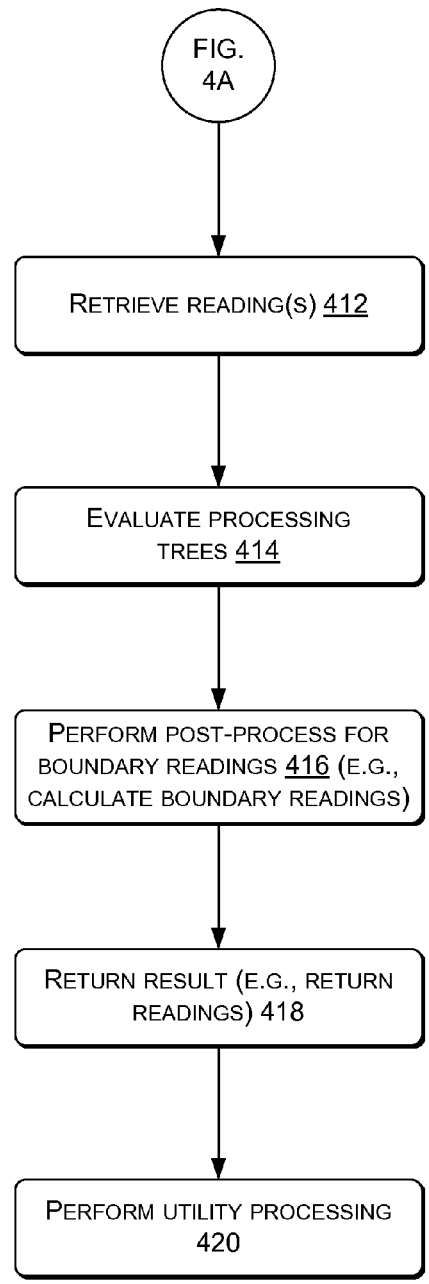

FIGS. 4A-4B illustrate the example process 400 for retrieving readings for service point channels from a utility data store.

In FIG. 4A, at 402, the calculation engine 214 may receive a request for one or more readings for service point channels 1-R over a specified time span. The service point channels 1-R may comprise the root service point channels. The request may be received from a processing entity, such as an application of the MDM service 210 (e.g., the utility processing engine 216), a third party, a web service, or any other entity. In some instances, the request may request boundary readings of the specified time span (e.g., readings that are at, or within a predetermined time period to, start and end times of the time span).

At 404, the calculation engine 214 may perform preprocessing for boundary readings. The preprocessing may generally include determining whether or not a boundary reading exists in the utility data store 108 and setting a time span for performing tree processing techniques (e.g., building the trees, retrieving readings for the trees, and evaluating the trees). Example preprocessing techniques for boundary readings will be discussed in further detail below in reference to FIG. 5A.

At 406(1)-406(R), the calculation engine 214 may generate a generation of a service point processing tree for each of the service point channels 1-R. As illustrated, the processing trees may be generated in parallel. As noted above, a generation of a processing tree may represent a horizontal level of service point channels within the processing tree. Each generation of a processing tree may generally result from a formula service point channel that requires the evaluation of contributor service point channels (e.g., service point channels at a lower generation than the formula service point channel).

At 408, the calculation engine 214 may retrieve configuration data for the current generation of the processing trees. In many instances, all configuration data for the current generation of service point channels within the processing trees is obtained at substantially a same time. That is, the configuration data may be obtained with a single query (e.g., request) to a data store. The configuration data may provide information about the service point channels for that generation in order to retrieve readings for those service point channels. In some instances, configuration data may indicate that a service point channel is a formula channel that requires the evaluation of a contributor service point channel at a lower generation. Although the operation 408 is illustrated in the example process 400 as being performed after the operations 406(1)-406(R), in some instances the operation 408 may be performed before the operations 406(1)-406(R).

At 410, the calculation engine 214 may determine whether or not the current generation for the processing trees is a last generation for of the processing trees. That is, the engine 214 may determine whether or not any of the service point processing trees has a further generation to be generated. If there are further generations to be generated in any of the processing trees 1-R (e.g., the NO branch), the process 400 may return to operations 406(1)-406(R). To generate and retrieve configuration data for a next generation within the processing trees, the calculation engine 214 may utilize configuration data for the generation above. The operations 406(1)-406(R) and 408 may be repeated any number of times until all service point processing trees are generated to a lowest generation. While retrieving configuration data at 408, the calculation engine 214 may refrain from obtaining configuration data that has already been obtained (e.g., configuration data already stored in local memory of the calculation engine 214). If there are no further generations to be generated at 410 (e.g., YES branch), the process 400 may proceed to 412 in FIG. 4B.

At 412 in FIG. 4B, the calculation engine 214 may retrieve one or more readings for the processing trees of the service point channels 1-R. In many instances, each and every reading for the processing trees is obtained from the utility data store 108 at substantially a same time (e.g., with a single query to the utility data store 108). Any configuration data that was obtained while building the processing trees may be utilized to retrieve the readings. For example, configuration data for a particular service point channel may indicate how a reading may be obtained for that particular service point channel.

At 414, the calculation engine 214 may evaluate the processing trees for the service point channels 1-R. To evaluate the processing trees, the calculation engine 214 may evaluate any formulas in each of the processing trees. For example, if a processing tree is associated with a formula service point channel, readings for contributor service point channels to that formula service point channel may be used to determine a reading for the formula service point channel. An evaluation of a processing tree may result in one or more readings for that processing tree.

At 416, the calculation engine 214 may perform a post-process for any requested boundary readings. The post-process may include calculating (e.g., estimating) a requested boundary readings based on one or more register and/or interval readings. The operation 416 may be performed when boundary readings are requested in a request for readings and when one or more criteria are satisfied. Example post-processing for boundary readings is discussed in further detail below in reference to FIG. 5B.

At 418, the calculation engine 214 may return a result to the entity that requested readings for service point channels. The result may include one or more readings for the service point channels determined through evaluating the processing trees associated with the service point channels. When boundary readings are requested, the result may include the requested boundary readings. The result may comprise a response to the request from the entity.

At 420, the entity that requested the readings may perform utility processing based on the one or more readings of the result. The operation 420 may be performed by an application of the MDM service 210 (e.g., the utility processing engine 216), a third party, a web service, or any other entity. The utility processing may include, for example, reporting one or more readings, aggregating one or more readings, validating one or more readings, estimating one or more readings, or any other process. In one example, the utility processing includes validating interval readings based on boundary readings associated with at least one register reading. Although illustrated as being included in the process 400, in some instances the operation 420 may be omitted.

Figure 5A:
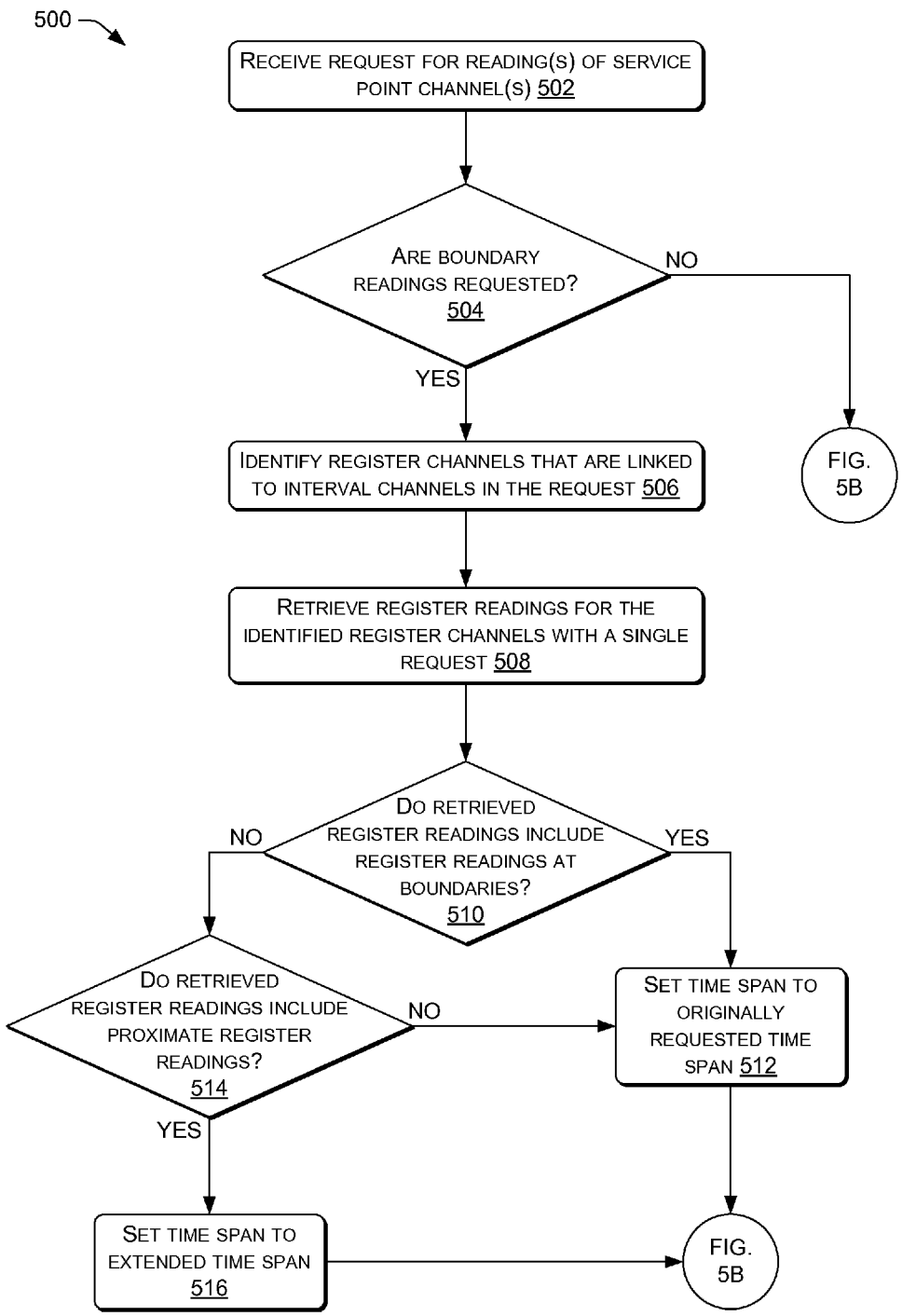
FIGS. 5A-5B illustrate an example process for performing processing for boundary readings.
Figure 5B:
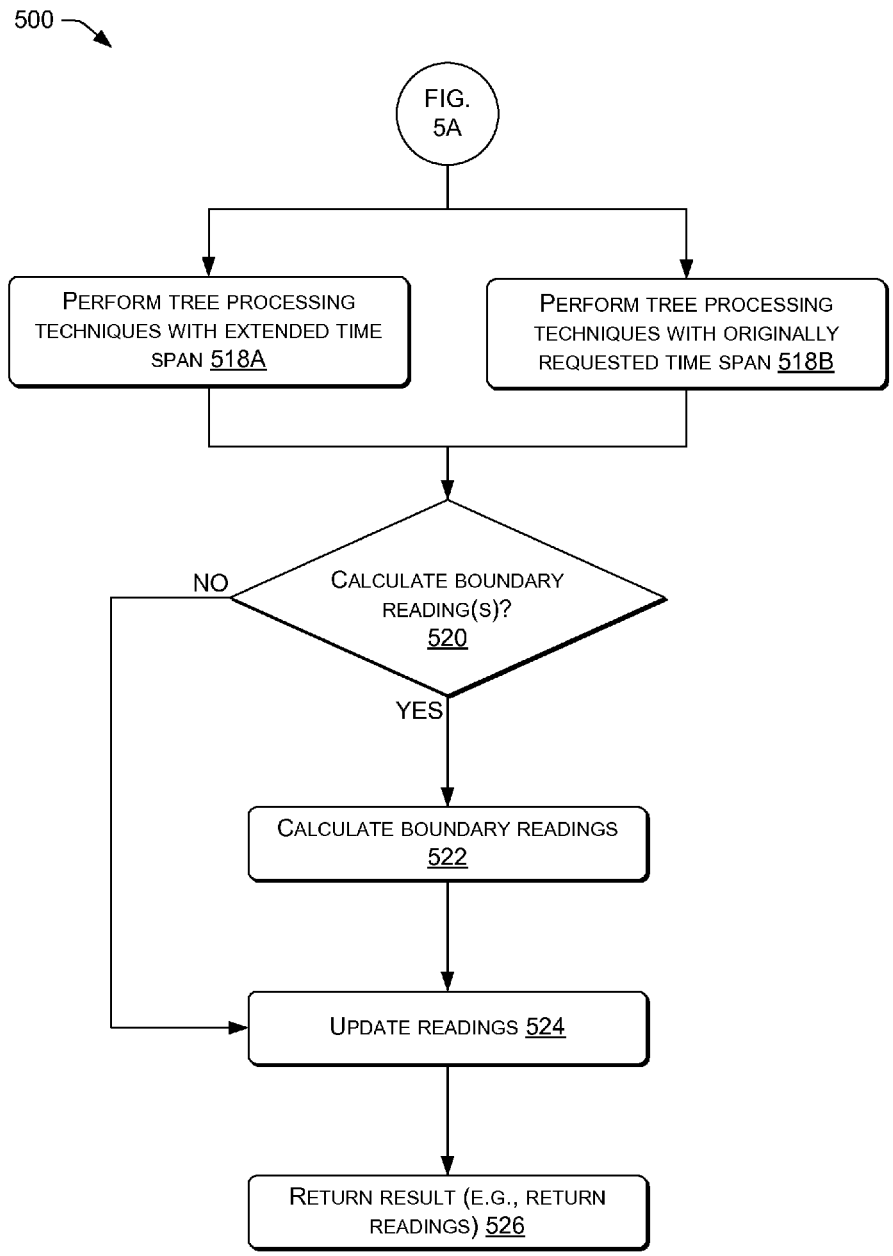

FIGS. 5A-5B illustrate the example process 500 for performing processing for boundary readings.

In FIG. 5A, at 502, the calculation engine 214 may receive a request for one or more readings for one or more service point channels over a specified time span. The request may request boundary readings for the specified time span (e.g., readings at start and end times of the time span). In particular implementations, the request may be for a register-based boundary reading—a register reading or a calculated reading that is based on a register reading. In some instances, the request may specify whether or not the requested boundary readings may be calculated boundary readings. The operation 502 may be performed as the operation 402 of FIG. 4A. That is, the request of 502 may be the same as the request of 402.

At 504, the calculation engine 214 may determine whether or not boundary readings are requested. When boundary readings are not requested, the process 500 may proceed to FIG. 5B (e.g., the NO branch). Alternatively, when boundary readings are requested (e.g., the YES branch), the process 500 may proceed to an operation 506.

At 506, the calculation engine 214 may identify register service point channels that are linked to interval service point channels. Here, the calculation engine 214 may select any interval service point channels that are identified in the request and identify interval service point channels from the selected interval service point channels that are associated with register service point channels. An association (e.g., a link) may exist between a register service point channel and an interval service point channel when the service point channels are measuring a same underlying stream of information or quantity (e.g., energy consumption).

At 508, the calculation engine 214 may retrieve register readings for the identified register channels with a single request (e.g., fetch) to the utility data store 108. Here, the calculation engine 214 may retrieve all register readings for the identified register service point channels over a particular time span. The particular time span may comprise an extended time span of the time span specified in the request. For example, if a specified time span in the request is for a 24-hour period on Wednesday, the extended time span may comprise a 72-hour time period including Tuesday, Wednesday, and Thursday. In some instances, at 508, the calculation engine 214 may utilize previously known or retrieved configuration data to retrieve register readings.

At 510, the calculation engine 214 may analyze the retrieved register readings to determine whether or not the retrieved register readings include register readings at the boundaries of the specified time span of the request. For example, when boundaries of the specified time span are at 1 PM and 5 PM, the calculation engine 214 may determine whether or not the retrieved readings include a reading at 1 PM and a reading at 5 PM, or readings that are substantially close to 1 PM and 5 PM (e.g., within a threshold time period to 1 PM and 5 PM). If the retrieved register readings include readings at both boundaries (e.g., readings at a boundary time or within a threshold to the boundary time), then the process 500 may proceed to 512 (e.g., the YES branch). Alternatively, if the retrieved register readings do include readings at both boundaries (e.g., readings at a boundary time or within a threshold to the boundary time), then the process 500 may proceed to 514 (e.g., the NO branch). When proceeding along the NO branch, one or more boundary readings may have been determined as missing (referred to as a missing boundary reading). In some instances, if a request specifies that a boundary reading may not be calculated, then, at 510 the process 500 may proceed to 512 even if there is a missing boundary reading.

At 514, the calculation engine 214 may determine whether or not any of the retrieved register readings is in close proximity to a missing boundary reading (e.g., within a threshold time period to the missing boundary reading). That is, the calculation engine 214 may determine whether or not a proximate register reading to a missing boundary reading exists which is suitable to be used as a base register reading for estimating the missing boundary reading. A suitable reading may be a reading that satisfies one or more quality criteria. If a proximate register reading exists for any missing boundary readings (e.g., the YES branch), then the process 500 may proceed to 516. Alternatively, if a proximate reading does not exist for any missing boundary readings (e.g., the NO branch), then the process 500 may proceed to 512.

At 512, the calculation engine 214 may set a time span for performing tree processing techniques on an interval channel which is linked to a register channel to the specified time span of the request (e.g., the original time span). Meanwhile, at 516, the calculation engine 214 may set a time span for performing tree processing techniques on an interval channel which is linked to a register channel to an extended time span (e.g., a time span that is longer than the originally requested time span).

In sum, at 510, and 514 if reached, the calculation engine 214 may determine whether or not one or more criteria are satisfied. For example, at 510, the calculation engine 214 may determine if the register readings retrieved at 508 are missing a requested boundary reading. If a boundary reading is missing, the calculation engine 214 may then determine at 514 if there exists a proximate register reading to be used as a base reading for estimating the missing boundary reading.

The operation 510 may be performed for each of the interval service point channels that are linked to register service point channels. This may enable a time span for performing tree processing techniques to be set at 512 or 516 for each of the linked interval service point channels. A time span for a linked interval channel may be set to either the originally requested time span (at 512) or an extended time span (at 516). The set time spans may be utilized for retrieving readings for the linked interval service point channels with the tree processing techniques, as discussed below.

In some instances, the calculation engine 214 may evaluate one or more variables to determine whether or not to fetch all readings while performing the tree processing techniques with one fetch for an extended time span instead of utilizing two fetches, one for service point channels with the requested time span and one for service point channels with the extended time span. For example, the calculation engine 214 may determine to fetch all readings for all service point channels with an extended time span if: (i) a fetch time to the utility data store 108 is less than a particular round-trip threshold time, (ii) a reading rate of the utility data store 108 (e.g., readings per second) is less than a threshold rate, (iii) a percentage of a number of interval service point channels set to the extended time span with respect to the total number of linked interval service point channels is greater than a threshold percentage (e.g., 55% of the linked interval register channels are set to the extended time span), and/or (iv) a ratio of the length of the extended time span to the originally requested time span is less than a particular ratio (e.g., extended time span is less than 20% longer than the originally requested time span). In many instances, the one or more variables may be analyzed only when an extended time span for performing tree processing techniques is set for a particular number of linked interval service point channels.

At 518A in FIG. 5B, the calculation engine 214 may perform the tree processing techniques for interval service point channels that have been set to have such techniques performed with an extended time span. The tree processing techniques may include building processing trees for the interval service point channels, retrieving readings for the interval channels based on the processing trees, and evaluating the processing trees (techniques discussed above in reference to FIGS. 4A-4B). When retrieving readings for the interval service point channels (e.g., at 412 of FIG. 4B), the readings may be retrieved for the extended time span.

At 518B, the calculation engine 214 may perform the tree processing techniques for interval service point channels that have been set to have such techniques performed with the originally requested time span. In some instances, the operations 518A and 518B are performed in parallel (as illustrated).

Although the operations 518A and 518B are both illustrated in FIG. 5B, in some instances only one of the operations 518A and 518B may be performed. For example, when an extended time span for performing tree processing techniques is set for all linked interval service point channels (e.g., set time spans are overridden), the calculation engine 214 may only perform the operation 518A.

At 520, the calculation engine 214 may determine whether or not to calculate one or more boundary readings for one or more interval service point channels with linked register service point channels. For example, the calculation engine 214 may determine to calculate a boundary reading if a boundary reading is missing and a proximate register reading to the missing boundary reading exists. That is, if there is a missing boundary reading and a base boundary reading exists. If the calculation engine 214 determines to calculate a boundary reading, the process 500 may proceed to operation 522 (e.g., the YES branch). Alternatively, if the calculation engine 214 determines to not calculate a boundary reading, the process 500 may proceed to operation 524 (e.g., the NO branch).

At 522, the calculation engine 214 may calculate a boundary reading based on a proximate register reading (e.g., base register reading) and one or more interval readings retrieved at operations 518A and/or 518B. For example, the calculation engine 214 may utilize a proximate register reading that is at a time before a requested boundary reading and the retrieved interval readings that are in between the time of the proximate register reading and the boundary time to estimate the requested boundary reading. In one example, the requested boundary reading is estimated by adjusting the proximate register reading by adding or subtracting consumption implied by the interval readings which lie between the proximate reading and the actual boundary time.

At 524, the calculation engine 214 may update readings to be returned as a response to the request for readings. This may include removing interval readings and/or register readings that were obtained outside the originally requested time span. For example, if an entity requested readings for a particular day and interval readings were obtained for a previous day (e.g., in order to calculate a boundary reading), the interval readings for the previous day may be filtered-out so that the response includes only the requested readings. Although the operation 524 is illustrated as being included in the process 500, in some instances the operation 524 may not be performed, such as in instances when readings outside the originally requested time span were not obtained. The operations 520 and 524, as well as 522 if reached, may be performed independently for each interval service point channel with a linked register service point channel.

At 526, the calculation engine 214 may return a result to the entity that requested the one or more readings for the one or more service point channels. The result may include boundary readings that are requested. The returned boundary readings may comprise readings at the boundaries and/or calculated readings.

In some instances, the process 500 may enable an entity to obtain boundary readings of a specified time span. In one example, the utility processing engine 216, a third party, a web service, or any other entity requests register-based boundary readings to validate usage of a resource that is calculated based on one or more interval readings. In another example, an entity requests register-based boundary readings to estimate a missing interval reading. The process 500 may be utilized to provide such boundary readings to a requesting entity.

In some instances, the process 500 may only require one or two fetches in addition to the fetches for the tree processing techniques. For example, the process 500 may require one fetch at 508 to obtain register readings, and another fetch at 518A to obtain interval readings for an extended time span (e.g., the operation 518B may be performed during normal tree processing techniques). This may reduce a number of fetches needed to provide a boundary reading, in comparison to previous techniques. In addition, the process 500 may efficiently fetch interval readings needed to estimate a boundary reading by fetching the readings at a same time as interval readings originally requested (e.g., readings to be returned directly). If the interval readings needed to estimate the boundary reading are within the original time span, then the readings may be obtained without an additional data retrieval cost. Further, if the interval readings needed to estimate the boundary reading are within an extended time span but are outside the original time span, the readings may be obtained with a relatively small data retrieval cost due to the longer time span. Here, the readings may be fetched in a same fetch as the interval readings within the original time span.

Conclusion

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method comprising:
   under control of one or more computing systems configured with specific executable instructions,
   receiving a request for boundary readings of one or more service point channels for a first time period, the service point channels including one or more interval channels;
   identifying one or more register channels that are associated with the one or more interval channels;
   retrieving, with a single request to a data store, one or more register readings for the one or more register channels that are associated with a second time period;
   determining that one or more criteria are satisfied based at least in part on the one or more register readings; and
   upon determining that the one or more criteria are satisfied,
      retrieving one or more interval readings for the one or more interval channels that are within the second time period with a single request to the data store; and
      estimating at least one of the requested boundary readings based at least in part on the one or more register readings and the one or more interval readings.

2. The method of claim 1, wherein determining that the one or more criteria are satisfied comprises:
   determining that the one or more register readings do not include the requested boundary readings; and
   determining that the one or more retrieved register readings include at least one proximate register reading to at least one of the requested boundary readings.

3. The method of claim 1, wherein the second time period comprises an extended time period that is longer than the first time period.

4. The method of claim 1, further comprising:
   providing at least one of the estimated boundary readings as a response to the request for the boundary readings.

5. The method of claim 1, wherein the at least one of the requested boundary readings is estimated based at least in part on at least one of the one or more register readings that is proximate to the at least one requested boundary reading.

6. One or more non-transitory computer-readable storage media storing computer-readable instructions that, when executed, instruct one or more processors to perform operations comprising:
   determining that one or more boundary readings are requested;
   identifying a first time period for which the o ne or more boundary readings are requested;
   retrieving one or more register readings that are within a second time period with a single request to a data store, the second time period being longer than the first time period;
   determining whether or not to estimate the one or more requested boundary readings based at least in part on the one or more retrieved register readings; and
   upon determining to estimate the one or more requested boundary readings, retrieving one or more interval readings from the data store and estimating the one or more requested boundary readings from the one or more interval readings.

7. The one or more non-transitory computer-readable storage media of claim 6, wherein the one or more register readings are retrieved from one or more register channels that are linked to one or more interval channels.

8. The one or more non-transitory computer-readable storage media of claim 7, wherein determining whether or not to estimate the one or more requested boundary readings is performed for each of the one or more interval channels that are linked to the one or more register channels.

9. The one or more non-transitory computer-readable storage media of claim 6, wherein retrieving the one or more interval readings comprises retrieving one or more interval readings that are within the second time period.

10. The one or more non-transitory computer-readable storage media of claim 6, wherein determining whether or not to estimate the one or more requested boundary readings is based at least in part on whether or not at least one reading at a boundary is included in the one or more retrieved register readings and whether or not at least one proximate register reading is included in the one or more retrieved register readings.

11. The one or more non-transitory computer-readable storage media of claim 6, wherein the one or more interval readings are retrieved with a single request to the data store.

12. The one or more non-transitory computer-readable storage media of claim 6, wherein the one or more requested boundary readings are estimated based at least in part on the one or more interval readings and at least one register reading, from among the one or more retrieved register readings, that is proximate in time to a time of the one or more requested boundary readings.

13. A method comprising:
    under control of one or more computing systems configured with specific executable instructions,
    identifying a request for one or more register-based boundary readings of a first time period;
    causing one or more register readings that are within a second time period to be retrieved with a single request to a data store;
    determining to calculate the one or more register-based boundary readings based at least in part on a proximity of the one or more register readings to the one or more register-based boundary readings;
    causing one or more interval readings that are within the second time period to be retrieved; and
    calculating the one or more register-based boundary readings based at least in part on the one or more interval readings and the one or more register readings.

14. The method of claim 13, wherein determining to calculate the one or more register-based boundary readings comprises:
    determining that the one or more register readings do not include the requested register-based boundary readings; and
    determining that the one or more register readings include at least one proximate register reading to at least one of the requested register-based boundary readings.

15. The method of claim 13, wherein the second time period is longer than the first time period.

16. The method of claim 13, wherein the one or more interval readings are retrieved with a single request to the data store.

17. The method of claim 13, wherein the one or more register-based boundary readings are calculated from a register reading, from among the one or more register readings, that is proximate to at least one of the one or more register-based boundary readings.

18. The method of claim 17, wherein the one or more register-based boundary readings are calculated from a proximate interval reading and from the register reading that is proximate to the at least one of the one or more register-based boundary readings.

19. The method of claim 13, further comprising:
providing the one or more calculated boundary readings to be utilized for boundary processing.

20. A system comprising:
one or more processors; and
memory storing executable instructions that, when executed by the one or more processors, cause the one or more processors to perform the method of claim 1.

\* \* \* \* \*